No. 793,765. PATENTED JULY 4, 1905.
W. F. BOCKHOFF & E. J. VON PEIN.
CASH REGISTER.
APPLICATION FILED JULY 24, 1903.

5 SHEETS—SHEET 1.

No. 793,765. PATENTED JULY 4, 1905.
W. F. BOCKHOFF & E. J. VON PEIN.
CASH REGISTER.
APPLICATION FILED JULY 24, 1903.

5 SHEETS—SHEET 2.

Witnesses
W. McCarthy
E. N. Beust

Inventors
Wm. F. Bockhoff
Edw. J. Von Pein
by Frank Parker Davis
Attorneys

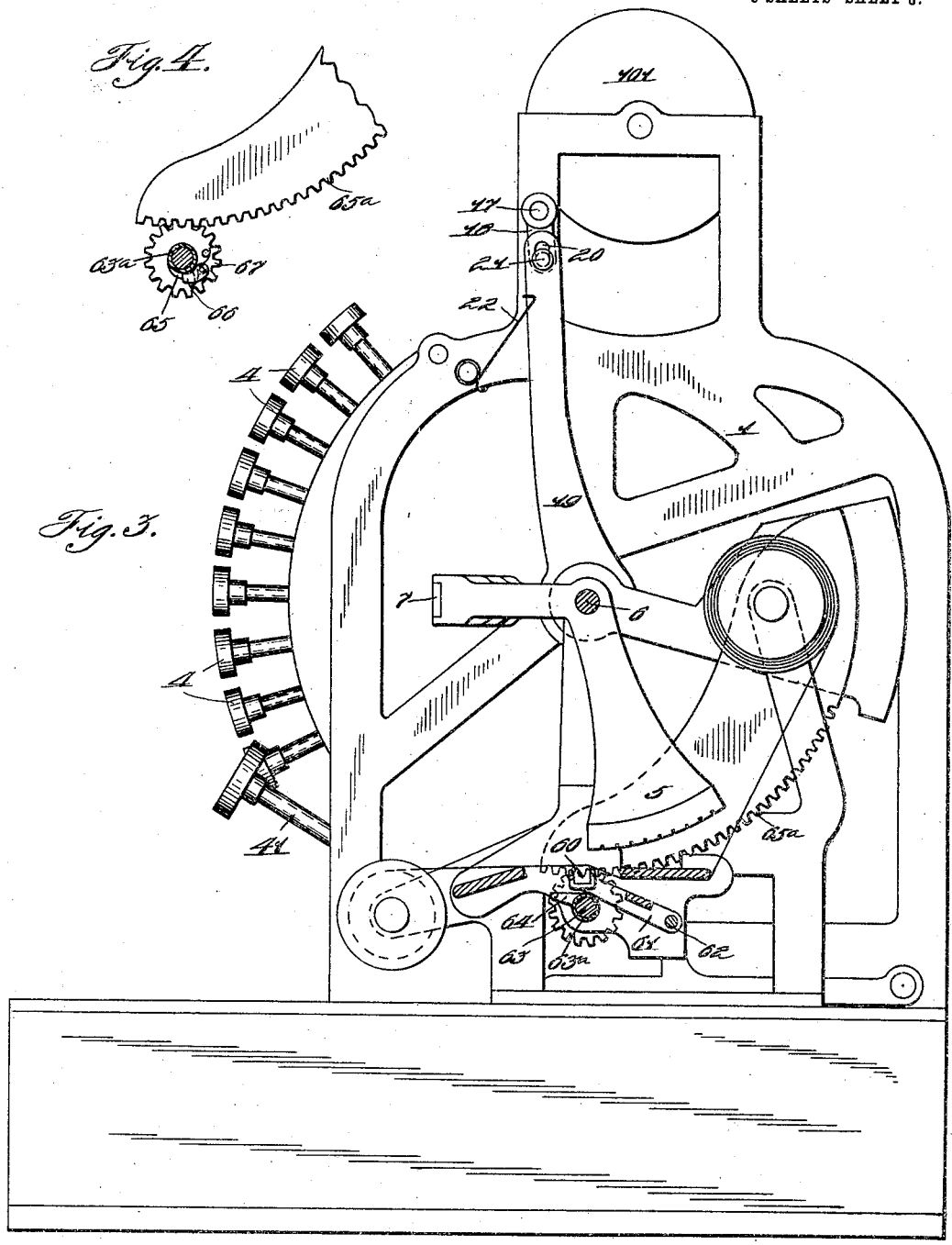

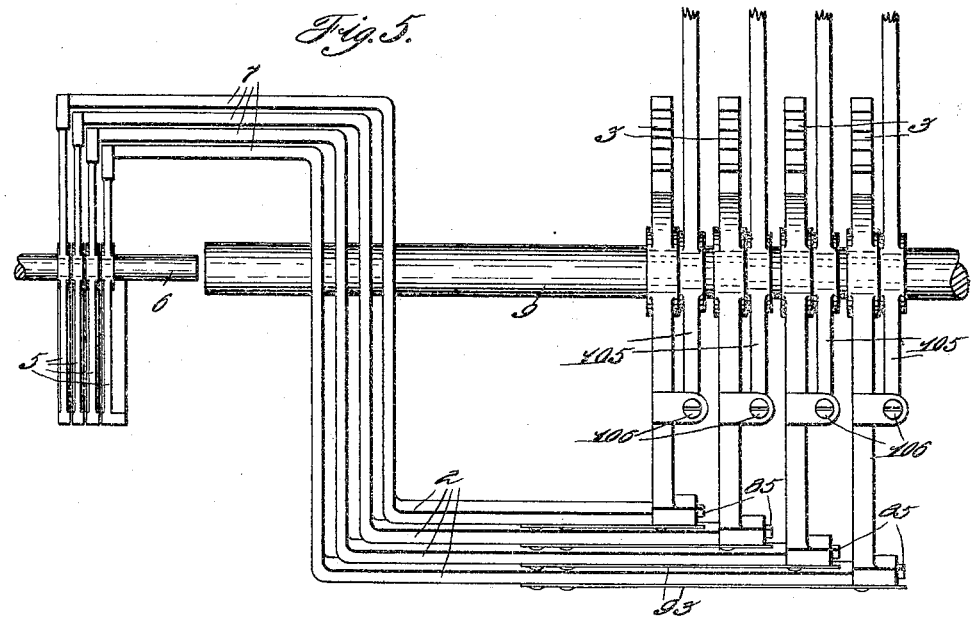
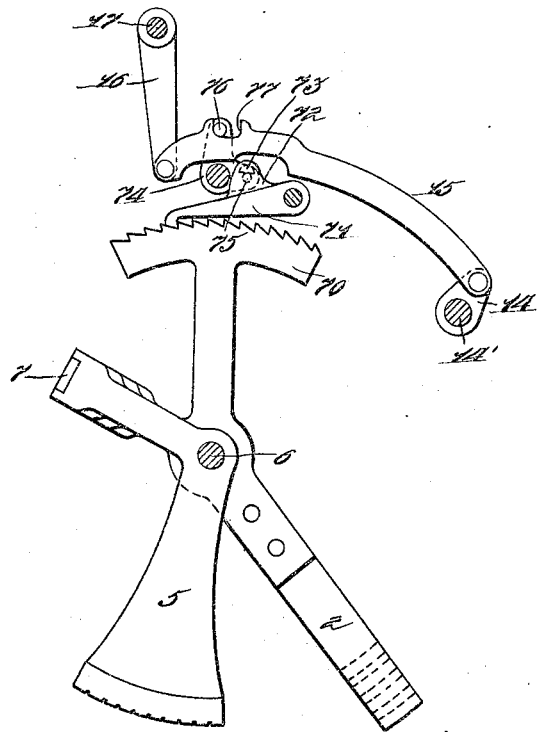

No. 793,765. PATENTED JULY 4, 1905.
W. F. BOCKHOFF & E. J. VON PEIN.
CASH REGISTER.
APPLICATION FILED JULY 24, 1903.
5 SHEETS—SHEET 5.
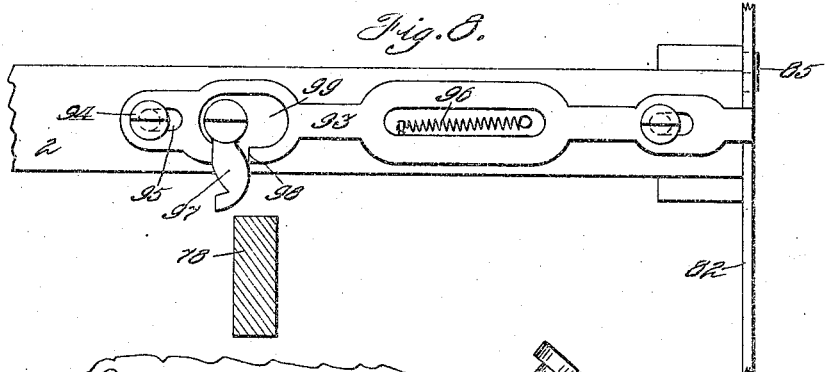
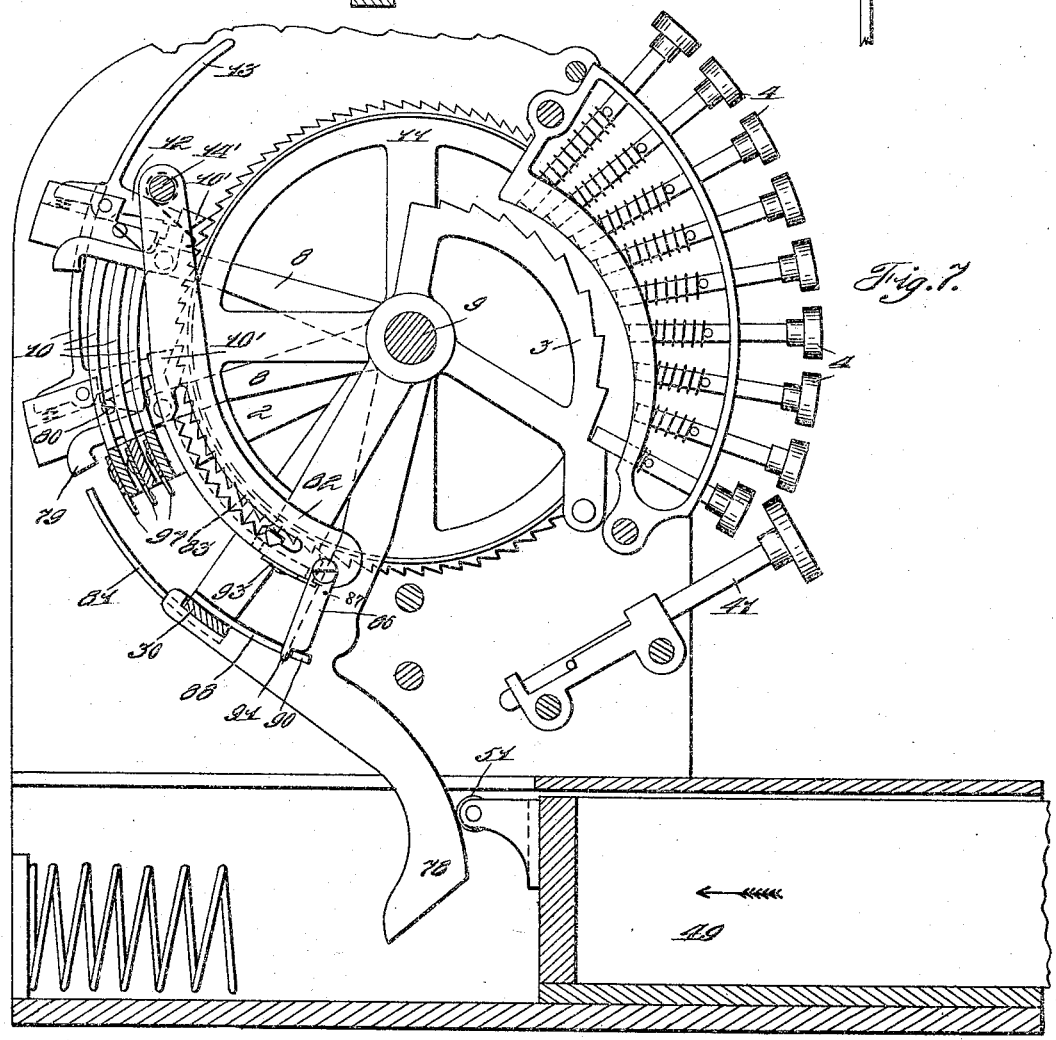
Witnesses
Inventors
Attorneys No. 793,765. Patented July 4, 1905.

UNITED STATES PATENT OFFICE.

WILLIAM F. BOCKHOFF, OF INDIANAPOLIS, INDIANA, AND EDWARD J. VON PEIN, OF DAYTON, OHIO, ASSIGNORS TO NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 793,765, dated July 4, 1905.

Application filed July 24, 1903. Serial No. 166,838.

*To all whom it may concern:*

Be it known that we, WILLIAM F. BOCKHOFF, residing at Indianapolis, county of Marion, and State of Indiana, and EDWARD J. VON PEIN, residing at Dayton, in the county of Montgomery and State of Ohio, citizens of the United States, have invented certain new and useful Improvements in Cash-Registers, of which we declare the following to be a full, clear, and exact description.

This invention relates to improvements in cash-registers, and has more particular relation to improvements in registers of the type patented to Henry S. Hallwood July 15, 1902, No. 704,796.

The principal object of the invention is to provide improved locking devices for the several mechanisms of the machine to prevent any improper manipulation of the same.

The invention consists of certain novel constructions, combinations, and arrangements of parts, all of which will be hereinafter more particularly set forth and claimed.

Figure 1:
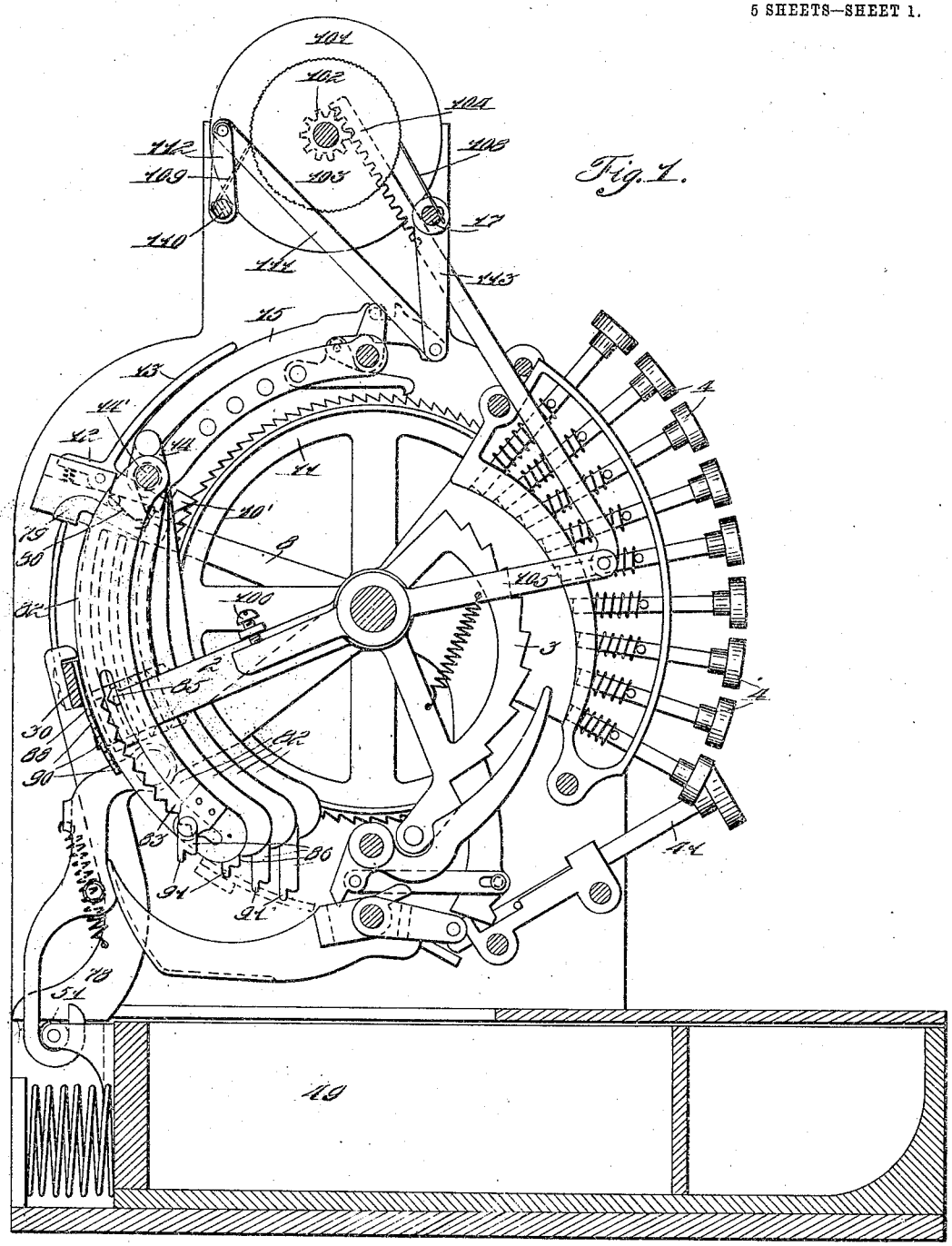
Figure 2:
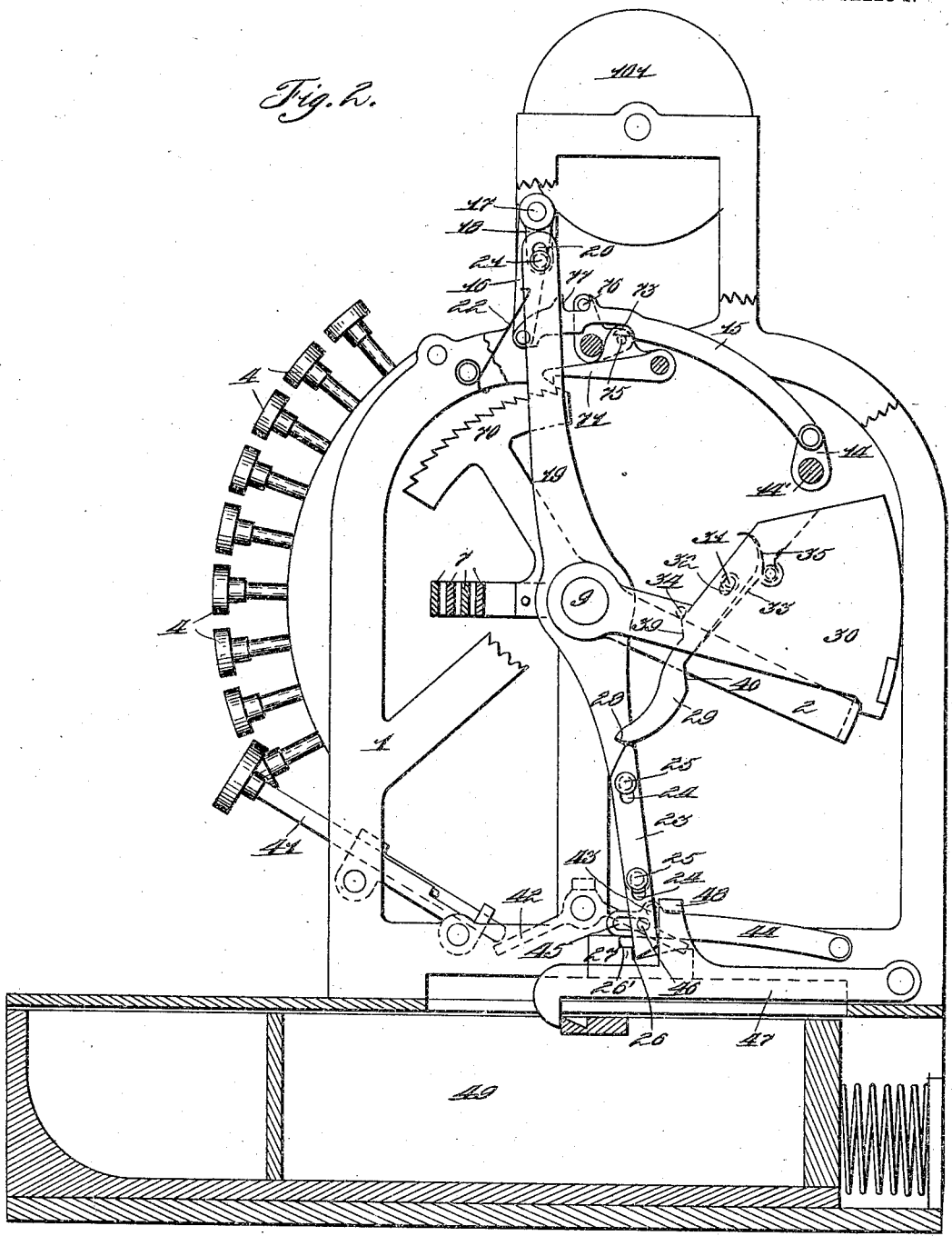

In the accompanying drawings, forming part of this specification, Figure 1 represents a vertical transverse section through a machine of the type mentioned with our improvements applied thereto. Fig. 2 represents a similar section taken outside of the frame of the machine and looking in the opposite direction, the frame being partly broken away to more clearly expose our improved devices. Fig. 3 represents an end elevation of a machine of the type mentioned, showing the printing devices and the connecting mechanism. Fig. 4 represents a detail side elevation, partly in section, of the operating-segment and gearing controlling the printing-platen. Fig. 5 represents a top plan view of the several auxiliary yokes, their stop-segments, and the printing-segments connected thereto. Fig. 6 represents a detail side elevation of the auxiliary yokes, printing-segments, and a portion of the locking devices for the same. Fig. 7 represents a transverse vertical section through the machine, partly broken away and showing the locking devices for the auxiliary yokes for locking the same after the printing has taken place; and Fig. 8 represents a detail rear elevation of one of the auxiliary yokes and its latch, the main operating-lever being shown in section.

As the machine shown in the present drawings is of practically the same type as that shown and described in the aforesaid patent to Hallwood, reference is made to this patent for such detail description of the parts as are not given in the present specification. In order to facilitate a better understanding of the invention, however, the machine may be described in general terms as comprising a series of oscillatory elements or yokes 2, which are pivotally mounted upon a common shaft and each of which is provided with a graduated stop-segment 3. This segment coöperates with a series of stop-keys 4 to limit the movements of the yokes. A series of type-segments 5 are pivotally mounted upon a short shaft 6 and are connected to the auxiliary yokes 2 by nested angular arms 7, whereby the carriers are given movements corresponding to the auxiliary yokes to which they are connected. Each of the yokes 2 is controlled by a single bank of nine keys, numbered from "1" to "9," and as the yokes must thus move according to the values of the keys operated in their respective banks such movements are utilized for effecting the registrations. To this end each of the yokes 2 supports a lever 8, pivoted upon the main shaft 9 and provided with a pendent arm 10, which rests upon its respective yoke.

Each of the levers 8 carries an operating-pawl 10', which is arranged to engage with the teeth of one of a series of registering-wheels 11, which are mounted upon the shaft 9. In order to prevent overthrow of the registering-wheels, the pawls 10' are arranged to be locked in engagement with the teeth of the registering-wheels by angular spring-pressed locking-pawls 12, mounted upon the levers 8 and provided with upwardly-extending curved arms 13. These arms 13 are so formed as to project into the path of movement of a pivoted frame 14, no matter what positions the levers 8 may assume. The office of the pivoted frame 14 is to rock the locking-pawls and disengage them from the respective operating-pawls to permit said latter pawls to ride over the teeth of the registering-wheels during the downward movement of the levers 8. The frame 14 is rocked to accomplish the above purpose by means of an elongated bar 15, which is pivoted to said frame and to a pendent arm 16, rigidly mounted upon a transverse rock-shaft 17. This shaft 17, as best shown in Fig. 2, is provided with a pendent crank-arm 18. A lever 19 is mounted upon the extended end of the shaft 9 and is provided at its upper end with an elongated slot 20, through which passes a headed pin 21, secured to the arm 18. A spring 22, mounted upon the main frame 1, engages the forward edge of the lever 19 near its upper end, and thus exerts its tension to force the upper end of the lever rearward when said lever is released at its lower end, as will be presently described. A slide 23, formed with elongated slots 24, is mounted upon the lower end of the lever 19 by means of headed pins 25, which pass through said slots and into said lever. The lower end of this slide 23, which projects some distance below the lower end of the lever 19, is arranged to normally engage the wall of a notch 26, formed in a stop-block 27, mounted on the main frame. The slide is held down in this position by the cam end 28 of a slide 29, which is mounted upon the main yoke 30, hereinafter more fully described, by means of a pin 31, which passes through an elongated slot 32, formed in the slide. The slide is guided by the wall or flange 33 of the main yoke and is limited in its movements by a pin 34, also mounted on the main yoke. A spring 35, mounted on the main yoke, engages the upper or rear end of the slide 29 to normally force the same downward and forward at its upper end.

When the slide 23 is elevated, as hereinafter described, its upper end engages the cam end 28 of the slide 29, and thus forces the slide rearward and upward against the tension of the spring 35. When the slide 23 is elevated in this manner, the tension of the spring 22 throws the upper end of the lever 19 rearward and forces the lower end of the slide 23 into a second notch 26' of the block 27, thus rocking the shaft 17 and the arm 14 to cause the latter to disengage the locking-pawls 12 from the operating-pawls 10. As the main yoke passes downward the curved portion of the slide 29 engages the upper end of the slide 23 and the lower end of the slide 29 is cammed upward against the tension of the spring 35, the pin 31 acting as a fulcrum. This changing movement is not blocked by the pin 34, as this pin is brought into alinement with a notch 39, formed in the slide 29, when the slide is given its initial longitudinal movement. The curved portion of the slide 29 finally passes forward of the upper end of the slide 23, and said slide 29 is then again moved longitudinally and rocked upon its fulcrum by the spring 35, which operation brings a shoulder 40 in front of the slide 23 and also moves the notch 39 out of alinement with the pin 34. This pin now locks the slide 29 against any pivotal movement, and when the main yoke 30 is returned to its normal position the shoulder 40 engages the upper end of the slide 23, draws the same rearward, and finally forces it downward, which operation moves the lower end of the slide out of the notch 26' and into the notch 26. The timing of the movement of the slide 23 is such that the lever 19 is rocked to lock the frame 14 just prior to the beginning of the registering movement, whereby the registering-pawls are again locked by the pawls 13 to the registering-wheels to prevent any overthrow.

The slide 23, as has before been stated, is elevated upon the initial movement of a special key 41, which is suitably mounted in the main frame so that its lower end will contact with and operate a rocking frame 42. The rear portion of this frame is arranged to contact with a pin 43, mounted upon a pivoted lever 44, and thus elevate the forward end of said lever. This lever is formed with an elongated slot 45, into which projects a pin 46, mounted on the slide 23. A pivoted drawer-latch 47, mounted upon the main frame, is formed with an arm 48, which projects over the top of the lever 44, whereby the drawer 49 is released upon the operation of the key 41. As the drawer passes forward the main yoke 30, which is provided with a pendent arm 78, resting upon the roller 51 of the drawer, is allowed to rock downward and the main yoke, as well as the auxiliary yokes, are thus lowered.

From the foregoing description it will be seen that when the key 41 is operated the cash-drawer will be released and the main yoke, together with the auxiliary yokes, will be allowed to drop according to the values of the keys operated as the drawer opens. As the auxiliary yokes move to these set positions they carry the type-carriers with them and the types upon these carriers are brought to positions to print the amounts represented by the keys operated. In order to take an impression from the set types, a resilient platen 60 is mounted upon a frame 61, pivotally mounted upon the main frame, as at 62. A rotary shaft 63 is mounted below the platen-frame 61 and supports a sleeve 63$^a$. This sleeve carries a cam-arm 64, which when the sleeve is rotated forces the platen upward against the types. The sleeve 63$^a$ is provided near one end with a stop shoulder or projection 65, which is engaged by a spring-pressed pawl 66, mounted upon a pinion 67, as best shown in Fig. 4. The pinion 67 is loosely mounted upon the shaft 63 and meshes with a segmental rack 65ª, fast to the main yoke. When the main yoke drops, the pinion 67 is idly rotated; but when the yoke is elevated the movement of the pinion in the opposite direction causes the pawl 66 to engage the shoulder 65, and thus rotate the sleeve 63ª. Any suitable paper supporting and feeding devices and inking means may be provided. At this time the indicators, which are connected to the auxiliary yokes in a manner well understood in the art, are moved to their set positions. If the operator were dishonest and was minded to manipulate the machine, he could now grasp the printing-segments 5 and move the same backward, so that the imprint would be for a less amount than that represented by the depressed keys and the indicators previously set. As the register-operating pawls at this time would not be locked to the registering-wheels, the machine may be "pumped" indefinitely by working the printing-segments back and forth. If desired, the printing-segments after being printed from may be allowed to again pass forward, and thus move the indicators again to positions represented by the depressed keys. In such a manipulation of the machine the proper amounts would be indicated, but altogether different amounts would be printed, thus totally destroying the usefulness of the tape-printing attachment.

The object of the present invention is to overcome such injurious defects as those above described, as well as others hereinafter mentioned. For this purpose each of the auxiliary yokes is provided with a rigid toothed segment 70. (Better shown in Fig. 6.) A locking-pawl 71 equal to the width of all of the segments 70 is pivotally mounted above the said toothed segment 70 and is provided with an arm 72, having a laterally-projecting stud 73. A pivoted bell-crank lever 74, suitably mounted on the main frame, is provided with a pin 75, which projects under the stud 73. The upper arm of the bell-crank lever is provided with a pin 76, which projects into an elongated notch 77, formed in the link 15, heretofore described.

When the machine is in its normal position, the link 15 is drawn forward, as before described, and the bell-crank 74 is so positioned thereby that the locking-pawl 71 is elevated out of engagement with the teeth of the segment 70. The rocking of the shaft 17, however, takes place immediately upon the depression of the key 41, and the link 15 is thus moved rearward. This rearward movement permits the bell-crank lever 74 to rock rearward and downward, and thus removes the supporting-pin 75 from under the lug 73 and permits the locking-pawls 71 to engage the teeth of the segments 70. The printing-segments and the auxiliary yokes are thus locked against any movement prior to the time that the impression is made. Immediately after the impression the lever 19 is returned to its normal position, and by such return the segments 70 are unlocked. In order, however, to prevent any movement of the printing-segments other than their regular movement through the medium of the main operating-lever, we provide the devices illustrated more clearly in Figs. 7 and 8. These devices are brought into operation subsequent to the devices shown in Fig. 6, and their office is to lock the auxiliary yokes should an attempt be made to operate said yokes except through the medium of the main operating-lever 78, which is pivoted upon the shaft 9 and is operated by the cash-drawer, as fully described in the aforesaid patent. Each of the pawls 10' is provided with a rearwardly-extending projection 79, which projects slightly below its respective lever 8 and is held normal in this position with the pawl disengaged from the teeth of the registering-wheel by a spring 80, mounted on the lever 8 and engaging said pawl. Until the rear ends of the pawls 79 are elevated against the tension of the springs 80 the pawls will not engage the registering-wheels and become locked thereto by the locking-pawls 12, which drop in back of the operating-pawls when the latter have become engaged with the teeth of the registering-wheels. The elevation of the rear ends of the pawls 10' is accomplished by means of an angular arm 81, secured to the main operating-lever 78 and arranged to contact with the pawls of the respective levers just prior to the time the lever engages the respective auxiliary yoke. Loosely hung from the shaft 14' are a series of pendent arms 82, each of which is formed near its lower end with a segmental slot 83, having its rear wall toothed, as best shown in Figs. 1 and 7. The levers or segments 82 are of different lengths and progressively arranged so as to project down beside their respective auxiliary yokes. Each of these yokes carries a wedge-shaped lug 85, which projects through the slots 83 of its respective segment. The lower end of each of the segments is provided with a pivoted pendent curved pawl 86. Each of these pawls is limited in its downward movement by a pin 87, projecting therefrom and arranged to contact with the rear side of its particular segment 82, the purpose of the pin being merely to prevent the pawl 86 from swinging out of its proper pendent position. The pawls are operated by a series of arms 88, pendent from the main operating-yoke 30, which travels with the main operating-lever 78. Each of the arms 88, as best shown in Fig. 7, is provided with a laterally-projecting lug 90, arranged to contact with a nose 91, formed on its particular pawl 86.

As the printing operation is accomplished by the closing of the drawer and a consequent elevation of the lever 78, it will be seen that after the impression has been taken by the printing-segments the lever 78 will have been elevated sufficiently to cause all of the projections 90 to engage and operate the pawls 86, and thus force the segments 82 forward to cause the teeth 84 to engage and lock the lugs 85 of the different auxiliary yokes no matter what positions the latter may occupy. This forcing forward of the segments 82 is occasioned by the lug 90 coming in contact with the nose 91 of the pawl 86, thereby rotating the pawl upon its pivotal point, and since the distance between the lug 90 and the normal rearward position of the pivotal point of the lug 86 is slightly less than the radial length of the pawl the lug 90 when crowding by the pawl naturally forces the same forward to permit the passing of the lug 90 and of course thereby forces the segment 82 forward. The auxiliary yokes, and consequently the type-segments, remain in this locked condition until the lever 78 reaches a position in relation to any particular pawl 10′, in which it will engage and operate the pawl to force it into engagement with its registering-wheel. At this time the particular segment 82 pertaining to the pawl engaged and forced into engagement with the wheel will be unlocked, so that it may fall out of engagement with the lug 85 and the auxiliary yoke pertaining to said pawl. The devices for accomplishing this result are more plainly shown in Fig. 8. These devices comprise in each instance a slide 93, mounted on its particular yoke by means of headed bolts 94, which pass through elongated slots 95, formed on said slide. When one of the segments 82 is swung forward, as before described, the slide 93 is caused to automatically snap back of the same to hold it in its locking position by a coil-spring 96, which connects said slide to the auxiliary yoke. The segment continues to lock the auxiliary yoke until the slide 93 is again moved back against the tension of the spring 96. This operation only takes place when the particular pawl pertaining to a certain auxiliary yoke has been moved into engagement with its registering-wheel, as before described. To time the devices in the above manner, each auxiliary yoke is provided with a pivoted pendent pawl 97, which projects through a slot 98, extending from a recess 99, formed in the slide 93. The lower end of the pawl 97 is curved, as shown in Fig. 8, so that as the lever 78 passes upward it will engage this lower curved end and force the slide 93 to the left against the tension of the spring 96 and disengage the outer end of the slide from the segment 82.

After the parts have been operated, as above described, and the auxiliary yokes unlocked the pawls 10′ have become locked to the registering-wheels, and any movement of the auxiliary yokes, no matter how effected, will simply rotate the registering-wheels in a forward direction. As the wheels are locked against any retrograde movement and as the levers 8 are locked to the wheels through the medium of the pawls, it will be seen that while said levers may be elevated by manipulating the type-segments they will not again fall back, but will remain in the positions to which they are advanced by said manipulation.

The setting of the type-segments accompanies the regular operation of the machine, which is substantially identical with that of the patent above mentioned, and consists in first depressing the proper amount-keys to set them to act as stops for the stop-segments 3, which are connected to or form part of the auxiliary yokes. The drawer-release key 41 is then operated, which results in the drawer passing out of the casing and permitting the main operating-lever 78 to descend. As this lever passes downward it permits the auxiliary yokes which are supported thereby to drop until they are arrested by the operated keys. When the yokes 2 take up the positions as above described, it will be understood that the type-carriers are also similarly positioned ready for the printing operation, which takes place upon the initial closing movement of the drawer through the medium of the platen-operating mechanism above described. The levers 8 are released by the unlocking of the pawls 10′ from the counting-wheels during the initial operation of the machine. These levers 8 therefore practically drop with the auxiliary yokes and take up their positions according to the positions of the latter, so that when said yokes are returned to their upper or elevated positions the registration takes place.

It will be seen from the foregoing description that after the type-segments have been set, as above described, they become locked in position by a locking-pawl 71. The type-segments, and consequently the auxiliary yokes, remain locked in this position until after the printing operation has taken place. This printing operation is of course accomplished by the closing of the drawer and the elevation of the main operating-lever 78. Just after the printing operation takes place the main operating-lever has reached a position in which it or the brackets 88 will engage the pawls 86 and by forcing the same about on their pivots will operate the locking-levers 82 and force the same forward to lock all of the auxiliary yokes. The auxiliary yokes then remain locked until the main operating-lever 78 reaches a position in which it will operate the latch-plate 93 of any particular yoke. The main lever in rising first unlatches a particular yoke and then immediately engages the yoke to elevate it and effect the registration. By this means each yoke remains locked until such time as the main lever reaches a position to pick it up and return it to its normal position.

The amount-indicators 101 of the present machine are operated in substantially the same manner as the indicators shown and described in the aforesaid patent. Each of these indicators is provided with a pinion 102 and a latching-ratchet 103. The pinion 102 is engaged by a rack-bar 104, which is pivotally connected at its lower end to a lever 105, mounted on the main shaft and arranged to engage an adjusting-bolt 106, mounted upon its respective yoke 2, as plainly shown in Figs. 1 and 5.

It will be seen from the above that when the yokes drop and take up positions according to the keys operated the indicators 101 will be correspondingly set or rotated to bring the desired numerals thereon into alinement with the usual sight-windows in the cabinet. After the wheels are set, however, the yokes 2 are returned to their normal positions, and means must therefore be provided for preventing the return of the indicators until the succeeding operation of the machine. This means includes the rock-shaft 17, extending across the machine and provided with a series of spring-pawls 108, which are arranged to engage the ratchet-disks 103 of the indicators, and thus hold the indicators in their set positions. The shaft 17 is rocked at the proper time to engage the pawls with the ratchet-wheels by devices hereinbefore fully described. It will be observed, however, that the ratchet-teeth of the disks 103 are rather small and that the pawls 108 meet the same at an angle, so that if the indicator is given any amount of momentum it will not be a difficult matter for the indicator to spring beyond its proper position, and as a matter of fact this has been one manner of manipulation of this sort of machine. To produce this false indication, the operator would hold in upon the depressed key in such a manner as to prevent its corresponding yoke from dropping when the main yoke drops with the opening of the drawer, and then upon the initial closing movement of the drawer the pawls 108 are rocked inward just far enough to engage the ratchet-disks 103, at which point the operator would release the pressure upon the key, and thereby the yoke would drop suddenly, carrying with it the indicator, and the momentum of the indicator would be such as to cause the same to spring ahead of the yoke possibly a unit's distance or more, the direction of rotation of the indicator being such, as shown in Fig. 1, as to permit the indicator to fly by its proper position and then be retained in this improper position by the pressure of the spring-pawl 108, and thus a false indication would be secured. To obviate this difficulty, the shaft 17 is provided with a downwardly-extending arm 113, which by means of a link 111 is connected to an arm 112, fast upon a shaft 110, which shaft carries spring-pawls 109, similar to the pawls 108. These pawls by engaging the ratchet-disks 103 upon the opposite sides of the pawl 108 will of course absolutely prevent any overthrow movement due to the sliding of the ratchet 103 past the pawl 108. To make this device effective, it is of course necessary that the pawl 109 should at least engage the ratchet-disk 103 simultaneously with the pawl 108 or, if preferred, slightly prior to the engagement of the pawl 108, so that if the operator attempts to manipulate the machine in the manner above described and while holding the key in closes the drawer far enough to cause the pawl 108 to engage the ratchet-disk 103 the pawl 109 will in the meantime have engaged the disk 103, and the indicator will thereby be prevented absolutely from turning at all in the normal direction of the rotation in which it should turn to expose the proper indication, and thus it would not be possible for the operator to indicate an amount larger than the amount registered, which of course is the only way in which this manipulation could be used fraudulently. It will thus be seen that the two sets of pawls 108 and 109 by being brought into engagement with the indicator-ratchets practically simultaneously serve to hold the indicators positively against movement in either direction.

We do not care to limit ourselves to the application of our invention to a machine in which the parts are returned to their normal positions by the cash-drawer, as the several locking devices are applicable to machines in which the operating parts are returned to their normal positions after being set by means of operating-levers, cranks, or the like. Further, this invention is not limited to machines containing but a single counter, but can be applied with equal facility to machines containing a plurality of counters, the operation of the different parts being substantially identical with those here described and shown.

Having thus described our invention, what we claim, and desire to secure by Letters Patent, is—

1. In a cash-register, the combination with a series of operating elements, of a counter, means for limiting the movements of the elements to differential adjustments in one direction, a main actuator for restoring the elements in the opposite direction, and locking devices for preventing any restoring movement of the elements except through the medium of the main actuator.

2. In a cash-register, the combination with a series of oscillatory members, means for limiting the movements of said members to differential adjustments in one direction, a mechanism for restoring the members in the opposite direction, and locking devices for securing said members in adjusted position until actuated by the operating mechanism.

3. In a cash-register, the combination with a series of oscillatory members, means for limiting the movements of the members to differential adjustments in one direction, an operating mechanism for restoring said members in the opposite direction, a counter operated by the oscillatory members, and means controlled by the operating mechanism for locking the oscillatory members in adjusted positions independently of the connection with the counter.

4. In a cash-register, the combination with a series of oscillatory members, of means for limiting the movements of the members to differential adjustments in one direction, a main actuator for restoring said elements in the opposite direction, and locks for locking the operating elements in adjusted positions, and means connected with the main actuator for operating said locks immediately before the actuator commences to operate said members.

5. In a cash-register, the combination with a series of oscillatory elements, type-carriers connected thereto, means for limiting the movements of the elements in one direction, a main actuator for moving the elements in the opposite direction, locking devices for locking the elements in position after they are set against return movement, and means intermediate the main actuator and said lock for operating the latter.

6. In a cash-register, the combination with a series of oscillatory members, of a counter operated thereby, means for limiting the movements of the members in one direction, a main actuator for moving the members in the opposite direction, a lock for locking the members in set position against return movement, and means intermediate the main actuator and lock for operating the latter.

7. In a cash-register, the combination with a counter, of a series of nested yokes, a main operating-lever for the same, a series of keys for limiting the movements of the yokes in one direction, means for locking the yokes in their set positions, and devices controlled by the main actuator for unlocking said yokes.

8. In a cash-register, the combination with a counter, of a series of nested yokes, a main actuator for the same, means for limiting the movements of the yokes in one direction, devices for locking the yokes in their set positions, and means controlled by the main actuator for unlocking said yokes.

9. In a cash-register, the combination with a counter, of a series of nested yokes, a main actuator for returning the yokes to their normal positions after they have been operated, means for limiting the movement of said yokes, devices for locking the yokes in their set positions, and means intermediate the main actuator and the locking devices for operating the same just before said actuator engages the yokes to return them to their normal positions.

10. In a cash-register, the combination with a counter, of a series of nested yokes, a main actuator for returning the same to their normal positions, a series of keys for limiting the movements of the yokes in one direction, locking devices for locking the yokes in their set positions, and means intermediate the main actuator and the locking devices for operating the latter to release the yokes just prior to the time that the yokes are engaged by said actuator.

11. In a cash-register, the combination with a counter, of a series of nested yokes carrying stop-segments, a series of keys for limiting the movements of the segments, a main actuator for returning the yokes to their normal positions, locking devices for the yokes, and means intermediate the main actuator and said locking devices for operating the latter.

12. In a cash-register, the combination with a counter, of a series of registering elements, means for limiting the movements of said elements in one direction, a main actuator for returning the elements to their normal positions, locking devices for locking the elements in their set positions, and means intermediate the main actuator and the locking devices for operating the latter to unlock the operating elements before they are returned by said actuating member.

13. In a cash-register, the combination with a counter, of a series of operating elements, means for limiting the movements of the elements in one direction, a main actuator for returning the elements to their normal positions, two independent locking devices for said operating elements, and means intermediate the main actuator and said locking devices for successively operating the same.

14. In a cash-register, the combination with a counter, of counter-operating devices, two independent locking devices for the operating elements, and means intermediate the main actuator and said locking devices for throwing one into operative position before the other is thrown out of locking position whereby said locks are successively operated.

15. In a cash-register, the combination with a counter, of a series of oscillatory operating elements, means for limiting the movements of the elements in one direction, type-carriers connected to said elements, printing devices for taking an impression from the carriers, a main actuator for operating the printing devices and the registering elements, and two independent locking devices for the registering elements constructed to lock said elements before and after the printing operation.

16. In a cash-register, the combination with a series of nested yokes, of type-carriers connected thereto, means for limiting the movements of the yokes in one direction, printing mechanism for taking an impression from the type-carriers, a main actuator for the yokes constructed to also actuate the printing mechanism, and locking devices for said yokes also arranged to be operated by the main actuator.

17. In a cash-register, the combination with a series of operating elements, of a series of type-carriers connected thereto, means for limiting the movements of the operating elements in one direction, a main actuator for moving said elements in the opposite direction, impressing devices constructed to be operated by said main actuator, locking devices for the operating elements for locking them against return movement, and operating means intermediate the main actuator and said locking devices.

18. In a cash-register, the combination with a series of oscillatory operating elements, of a counter, toothed segments connected to the operating elements, locking devices engaging said segments, and a main actuator for operating the operating elements and for also operating said locking devices to unlock said elements prior to their movement by the main actuator.

19. In a cash-register, the combination with a series of operating elements, of a counter, type-carriers connected to said elements, a printing mechanism, locking-segments also connected to said elements, a lock coöperating with said segments to lock the latter from retrograde movement while being set, and a main actuator for operating the printing mechanism, the lock, and the operating elements.

20. In a cash-register, the combination with a series of operating elements, of a counter, a printing device connected to said elements, a platen, a main actuator for moving the operating elements and the platen, a lock for securing the operating elements prior to the operation of the platen, an independent lock for securing the operating elements after the operation of the platen, and operating devices intermediate the respective locks and the main actuator.

21. In a cash-register, the combination with a series of nested yokes, of a main actuator for returning the yokes to their normal positions after they have been set, means for limiting the movements of the yokes to their set positions, a counter, locking devices for the yokes, and means intermediate the main actuator and the locking devices for operating the latter during the period immediately preceding the operation of the yokes by such actuator.

22. In a cash-register, the combination with a series of nested operating-yokes, of a counter, means for limiting the movements of the yokes in one direction, a main actuator for moving the yokes in the opposite direction, locking devices for said yokes, and means intermediate the main actuator and locking devices for operating the latter to first lock the yokes and then subsequently to release them.

23. In a cash-register, the combination with a series of operating-yokes, of a counter, a main actuator, means for limiting the movements of the yokes in one direction, two independent locks for the yokes, and means intermediate the main actuator and said locks for successively controlling the latter for locking and unlocking the main yokes according to the position of the main actuator.

24. In a cash-register, the combination with a series of operating elements, of a counter, toothed segments connected to the operating elements, a locking-pawl engaging said segments to restrain their retrograde movements during their setting movements, and a main actuator controlling the movements of the pawl.

25. In a cash-register, the combination with a series of operating elements, of a counter, toothed segments connected to the operating elements, a pawl arranged to engage said segments to lock the same against movement in one direction, means for normally holding the pawl out of engagement with the segments, a key for releasing the pawl to allow it to engage the segments, and a main actuator for the operating elements constructed to disengage the pawl from the segments.

26. In a cash-register, the combination with a series of nested yokes, of graduated stop-segments connected thereto, a series of keys for limiting the movements of the stop-segments in one direction, a main actuator for moving the yokes in the opposite direction, a counter, counter-operating devices coöperating with the yokes, independent locks for the respective yokes, and means intermediate the locks and the main actuator for actuating said locks according to the relative positions taken up by the yokes in their initial movements.

27. In a cash-register, the combination with a series of operating-yokes, means for limiting the movements of the yokes in one direction, means for latching the yokes in their set positions, devices for preventing the return movement of the yokes, means for operating said devices and releasing the yokes, and a main actuator for returning the yokes to their normal positions.

28. In a cash-register, the combination with a series of oscillatory operating-yokes, means for limiting the movements of the yokes in one direction, a counter, a main actuator for returning the yokes to their normal positions, and mechanism for locking the yokes against return movement except by means of the main actuator.

29. In a cash-register, the combination with a series of operating elements, of a counter, means for limiting the movements of the elements in one direction, a main actuator for moving the elements in the opposite direction, independent locking devices for the operating elements, means intermediate the respective locking devices and the main actuator whereby the latter actuates said locking devices to force the same into locking position, latches for securing said locking devices in locking position, and means intermediate the said latches and the main actuator for operating the latches to release the locking devices.

30. In a cash-register, the combination with a series of operating elements, of a counter, a main actuator for said operating elements, locking devices for the elements, latches for said locking devices, and mechanism intermediate the main actuator and the locking devices and latches for controlling both of the latter.

31. In a cash-register, the combination with a series of nested yokes, of a counter, a counter-operating means intermediate the nested yokes and the counter, means for limiting the movements of the yokes in one direction, printing devices connected to the yokes, a main actuator for moving the yokes in the opposite direction, a series of toothed locking-segments for the respective yokes, and means intermediate said segments and the main actuator for operating said segments upon the return movement of the actuator.

32. In a cash-register, the combination with a series of nested operating-yokes, of a counter, means for limiting the movements of the yokes in one direction, a main actuator for moving the yokes in the opposite direction, a series of toothed pendent locking-segments coöperating with the respective yokes, latches for said segments, and a main actuator for returning the operating elements and operating the locking-segments and latches.

33. In a cash-register, the combination with a series of operating elements, of a counter, a main actuator, a ratchet-and-pawl mechanism associated with the operating elements for preventing any retrograde movement of them except upon the return of the main actuator.

34. In a cash-register, the combination with a series of operating-yokes, of a counter, locks for said yokes, automatic latches mounted on said yokes and arranged to engage the locking devices and hold them in position, a main actuator, and means intermediate said actuator and the automatic latches for operating the latter.

35. In a cash-register, the combination with an operating element, of an oscillatory indicator, locking-pawls for the indicator one for preventing movement in one direction and the other for preventing movement in the opposite direction, and means connecting said pawls to the moving parts of the machine for operating them at the proper time.

36. In a cash-register, the combination with an operating mechanism, of a series of oscillatory indicators connected thereto, ratchet-wheels mounted on said indicators, pawls engaging the opposite sides of the ratchet-wheels for preventing rotation in either direction, and means for bringing the pawls simultaneously into engagement with the ratchet-wheels.

37. In a cash-register, the combination with a series of operating elements, of a series of pivoted locking-segments for the same, a main actuator, and a series of pivoted pawls mounted on the locking-segments and arranged to be engaged by the main actuator for moving the segments by the movement of said actuator.

38. In a cash-register, the combination with a series of operating-yokes, of a series of locking-segments for the same, pivoted pawls mounted on said segments, and a main actuator arranged to engage said pawls to operate the locking-segments when the actuator is moved in one direction.

39. In a cash-register, the combination with a series of oscillatory operating elements, a series of toothed members for locking the same, movable devices mounted on the toothed members, and a main actuator arranged to engage said movable devices to operate the locking-segments when the actuator is moving in one direction.

40. In a cash-register, the combination with a series of operating-yokes, of a series of toothed segments arranged to engage projections on said yokes, pivoted pawls mounted on said segments, and a main actuator constructed to engage said pawls and thereby operate said segments.

41. In a cash-register, the combination with a differentially-movable operating element and a counter controlled thereby, of a toothed segment connected with said element, a locking-pawl engaging said element during the movement of the latter and preventing retrograde movement of the same, and a cash-drawer and connections for disengaging said pawl from said segment.

42. In a cash-register, the combination with a differentially-movable operating element and a counter controlled thereby, of a toothed segment connected with said element, a locking-pawl engaging said element during the movement of the latter and preventing retrograde movement of the same, a main actuator for restoring said element to normal position, and means controlled by said actuator for releasing the pawl from engagement with said segment.

In testimony whereof we affix our signatures in the presence of two witnesses.

WILLIAM F. BOCKHOFF.
EDWARD J. VON PEIN.

Witnesses:
E. F. WATSON,
PEARL N. SIGLER.